United States Patent
Stocker et al.

(10) Patent No.: US 12,235,170 B2
(45) Date of Patent: Feb. 25, 2025

(54) SENSOR AND METHOD FOR DETECTING GUIDED THERMAL RADIATION

(71) Applicant: Infineon Technologies AG, Neubiberg (DE)

(72) Inventors: Gerald Stocker, Finkenstein (AT); Elmar Aschauer, Ledenitzen (AT); Ulf Bartl, Villach (AT); Thomas Grille, Nötsch (AT); Christoph Kovatsch, Finkenstein (AT); Thomas Krotscheck Ostermann, Velden am Wörthersee (AT)

(73) Assignee: Infineon Technologies AG, Neubiberg (DE)

( * ) Notice: Subject to any disclaimer, the term of this patent is extended or adjusted under 35 U.S.C. 154(b) by 308 days.

(21) Appl. No.: 17/658,564

(22) Filed: Apr. 8, 2022

(65) Prior Publication Data
US 2022/0381753 A1 Dec. 1, 2022

(30) Foreign Application Priority Data
Jun. 1, 2021 (EP) ..................... 21177125

(51) Int. Cl.
*G01N 33/00* (2006.01)
*G01J 5/02* (2022.01)
(Continued)

(52) U.S. Cl.
CPC ............... *G01K 7/01* (2013.01); *G01J 5/022* (2013.01); *G01J 5/0802* (2022.01);
(Continued)

(58) Field of Classification Search
None
See application file for complete search history.

(56) References Cited

U.S. PATENT DOCUMENTS 7,709,795 B2   5/2010   Yamanaka
9,417,186 B2 *  8/2016   Jakoby ............... G01N 21/7703
(Continued)

FOREIGN PATENT DOCUMENTS

EP   0725269 A2   8/1996
EP   3715829 A1   9/2020
(Continued)

OTHER PUBLICATIONS

Green, William M.J., et al., "Silicon Photonic Gas Sensing", IEEE Optical Fiber Communications Conference and Exhibition (OFC), Mar. 3-7, 2019, 3 pages.

*Primary Examiner* — Marcus H Taningco
(74) *Attorney, Agent, or Firm* — Slater Matsil, LLP

(57) ABSTRACT

A fluid sensor includes a support structure having a top main surface region; a thermal emitter on the top main surface region of the support structure; a thermal radiation detector on the top main surface region of the support structure; and a waveguide structure having a first and a second waveguide section on the top main surface region of the support structure. The first waveguide section guides a first portion of the thermal radiation to the thermal radiation detector and the second waveguide section guides a second portion of the thermal radiation to the thermal radiation detector. The waveguide structure enables an interaction of an evanescence field of the guided first and/or second portion of the thermal radiation with a surrounding fluid.

20 Claims, 12 Drawing Sheets

(51) Int. Cl.
  *G01J 5/0802* (2022.01)
  *G01J 5/0818* (2022.01)
  *G01J 5/10* (2006.01)
  *G01K 7/01* (2006.01)
  *G01N 21/3504* (2014.01)

(52) U.S. Cl.
  CPC ............... *G01J 5/0818* (2013.01); *G01J 5/10* (2013.01); *G01N 21/3504* (2013.01)

(56) References Cited

U.S. PATENT DOCUMENTS

| | | |
|---|---|---|
| 10,345,227 B2 | 7/2019 | Lavchiev |
| 11,668,636 B2 * | 6/2023 | Kraft ................... G01N 21/534 356/338 |
| 2007/0101800 A1 | 5/2007 | Stenberg |
| 2013/0081447 A1 | 4/2013 | Carter |
| 2014/0061677 A1 | 3/2014 | Jakoby |
| 2017/0005220 A1 | 1/2017 | Kautzsch |
| 2017/0059499 A1 | 3/2017 | Duraffourg |
| 2019/0154570 A1 * | 5/2019 | Gylfason ............ G01N 21/3504 |
| 2020/0309686 A1 | 10/2020 | Grille et al. |
| 2020/0309691 A1 * | 10/2020 | Sakamoto ............... G02B 6/124 |

FOREIGN PATENT DOCUMENTS

| | | |
|---|---|---|
| FR | 3056750 A1 | 3/2018 |
| WO | 2016208176 A1 | 12/2016 |
| WO | 2017008077 A1 | 1/2017 |
| WO | 2019115698 A1 | 6/2019 |

* cited by examiner (Part 2)

SENSOR AND METHOD FOR DETECTING GUIDED THERMAL RADIATION

This application claims the benefit of European Patent Application No. 21177125, filed on Jun. 1, 2021, which application is hereby incorporated herein by reference.

TECHNICAL FIELD

Examples of the disclosure comprise sensors and methods for detecting guided thermal radiation.

BACKGROUND

The usage of thermal emitters in semiconductor technologies is always confronted with the challenge of efficiently using electric power, specifically for applications in multi-market and ATV (automotive). There are examples for the usage of planar emitters emitting their radiation either away from the surface or through the wafer. Such emitters can heat, for example, the interior of a housing. For purposeful radiation output, the same can be positioned by wafer-bond or chip-stacking. The disadvantage is that these are no monolithic solutions.

Furthermore, using thermal emitters for a determination of a fluid, radiation with a certain amount of energy has to be provided for an interaction with the fluid. So far, there is a target conflict between low power consumption and a significant interaction between radiation and fluid. Moreover, such a device or concept, for example for applications in multi-market and ATV should be associated with low costs and good availability.

Consequently, there is a need for a concept for fluid detection with improved electrical efficiency.

Such a need can be solved by the fluid sensor according to claim 1. Further, specific implementations of the fluid sensor are defined in the dependent claims.

SUMMARY

Examples of the disclosure comprise a fluid sensor, the fluid sensor comprising a support structure having a top main surface region, wherein the top main surface region of the support structure forms a common system plane of the sensor. The fluid sensor further comprises a thermal emitter on the top main surface region of the support structure, wherein the thermal emitter is configured to emit thermal radiation in at least two different radiation emission directions parallel to the system plane. In addition, the fluid sensor comprises a thermal radiation detector on the top main surface region of the support structure, wherein the thermal radiation detector is configured to detect thermal radiation. The fluid sensor further comprises a waveguide structure having a first and a second waveguide section on the top main surface region of the support structure. The first waveguide section is configured to guide a first portion of the thermal radiation, emitted by the thermal emitter in a first radiation emission direction of the at least two different radiation directions of the thermal emitter, to the thermal radiation detector and the second waveguide section is configured to guide a second portion of the thermal radiation, emitted by the thermal emitter in a second radiation emission direction of the at least two different radiation directions of the thermal emitter, to the thermal radiation detector. Moreover, the waveguide structure is configured to enable an interaction of an evanescence field of the guided first and/or second portion of the thermal radiation with a surrounding fluid.

Further examples of the disclosure comprise a method, the method comprising emitting thermal radiation in at least two different radiation emission directions parallel to a common system plane, wherein the common system plane is formed by a top main surface region of a support structure and wherein the thermal radiation is emitted by a thermal emitter arranged on the top main surface region of the support structure. In addition, the method comprises guiding a first portion of the thermal radiation, emitted by the thermal emitter in a first radiation emission direction of the at least two different radiation emission directions of the thermal emitter, to a thermal radiation detector via a first waveguide section of a waveguide structure, such that an evanescence field of the guided first portion of the thermal radiation interacts with a fluid that is surrounding the waveguide structure. Furthermore, the method comprises guiding a second portion of the thermal radiation, emitted by the thermal emitter in a second radiation emission direction of the at least two different radiation emission directions of the thermal emitter, to the thermal radiation detector via a second waveguide section of a waveguide structure, such that an evanescence field of the guided second portion of the thermal radiation interacts with the fluid that is surrounding the waveguide structure. The thermal radiation detector and the waveguide structure are arranged on the top main surface region of the support structure. Moreover, the method comprises detecting the guided first and/or second portion of the thermal radiation via the thermal radiation detector.

Examples of the disclosure are based on the idea to guide thermal radiation, emitted by a thermal emitter in at least two different radiation emission directions, via a waveguide structure, comprising a first and a second waveguide section, to a thermal radiation detector. Since thermal emission of a thermal emitter may not be focused in a single direction, collecting or capturing thermal emission, with the waveguide structure, that may otherwise be lost, may increase the level of efficiency. The collected thermal radiation guided by the waveguide structure may interact with a surrounding fluid via an evanescence filed of the radiation, before being detected by the thermal detector. In order to increase the amount of thermal radiation harvested by the waveguide structure, the waveguide structure comprises at least a first and a second waveguide section. Therefore, additionally, an area of the waveguide structure may be increased, for example in comparison to a waveguide that is only configured to collect thermal radiation of one main emission direction of a thermal emitter. As a synergistic effect, not only may the electrical efficiency be increased by the improved radiation recovery at the emitter, but with an increased area of the waveguide structure, having a plurality of waveguide sections in order to recover the radiation in a plurality of emission directions, an increased amount of interaction of an evanescence field of the guided radiation and surrounding fluid may be enabled. Consequently, with more radiation and increased interaction because of an increased waveguide area, better detection results may be determinable from the guided thermal radiation detected in the detector, for example with regard to the surrounding fluid. Therefore, a concentration of the surrounding fluid may, for example, be determined more precisely, or a detection threshold, for minimal amounts of detectable fluid, may be lowered.

The collecting or harvesting or capturing of thermal radiation by the waveguide structure may be performed along a common system plane of a sensor, according to the disclosure. However, the waveguide structure may also be arranged in three dimensions around the thermal emitter in order to increase the amount of radiation that may be guided by the waveguide to the detector. Therefore, the thermal emitter may emit thermal radiation in directions that are not parallel to the system plane, for example perpendicular, or at least partially perpendicular to the system plane.

Another key aspect according to examples of the disclosure is to turn a disadvantage of waveguides (WG), or for example of sensors comprising waveguides into an advantage. The usage of a WG may entail coupling losses. On the other hand, WGs can be used to use the emitter efficiently, for example as efficiently as possible. For a monolithic approach based on a thermal emitter, efficient usage of the emitter radiation may be decisive, this may only be possible with the usage of WGs.

According to examples of the disclosure, fluid sensors are provided, comprising waveguide structures, having an improved efficiency, by increasing the amount of radiation that is guided to the detector and used according to the particular application, e.g. by overcompensating the coupling losses caused by the waveguide structure. This may be achieved due to an emitter-waveguide structure-detector arrangement according to the disclosure. The waveguide structure may therefore be arranged in a plurality of radiation emission directions of the thermal emitter, in order to guide a large amount of radiation emitted to the detector. The amount of additional emission collected by the waveguide structure because of said arrangement may exceed the coupling losses.

Additionally, a waveguide structure, according to examples of the disclosure, e.g. a twin WG (for example a waveguide structure comprising a first and second waveguide section) may provide for more area for interacting with an analyte (larger interacting area with the surrounding fluid, e.g. gas to be sampled). Additionally, the detector may be heated from more than one, e.g. both sides.

The scheme or concept according to examples of the disclosure may unite one or more of the following advantages;
- energy efficiency: usage of the emitted radiation efficiently, e.g. as efficiently as possible
- form factor: the waveguide structure, e.g. a twin WG may offer a lot of interaction between radiation and fluid, e.g. gas, on a small area
- highly sensitive: improved resolution can be obtained due to more radiation power impinging on the detector
- monolithic sensor system: the sensor may be a monolithic sensor.

In other words, a key aspect of examples of the disclosure may be a high-efficient use of a thermal emitter and a detector by employing a waveguide structure, for example comprising curved waveguides.

BRIEF DESCRIPTION OF THE DRAWINGS

The drawings are not necessarily to scale, emphasis instead generally being placed upon illustrating the principles of the disclosure. In the following description, various examples of the disclosure are described with reference to the following drawings, in which.

DETAILED DESCRIPTION OF ILLUSTRATIVE EMBODIMENTS

Figure 1:
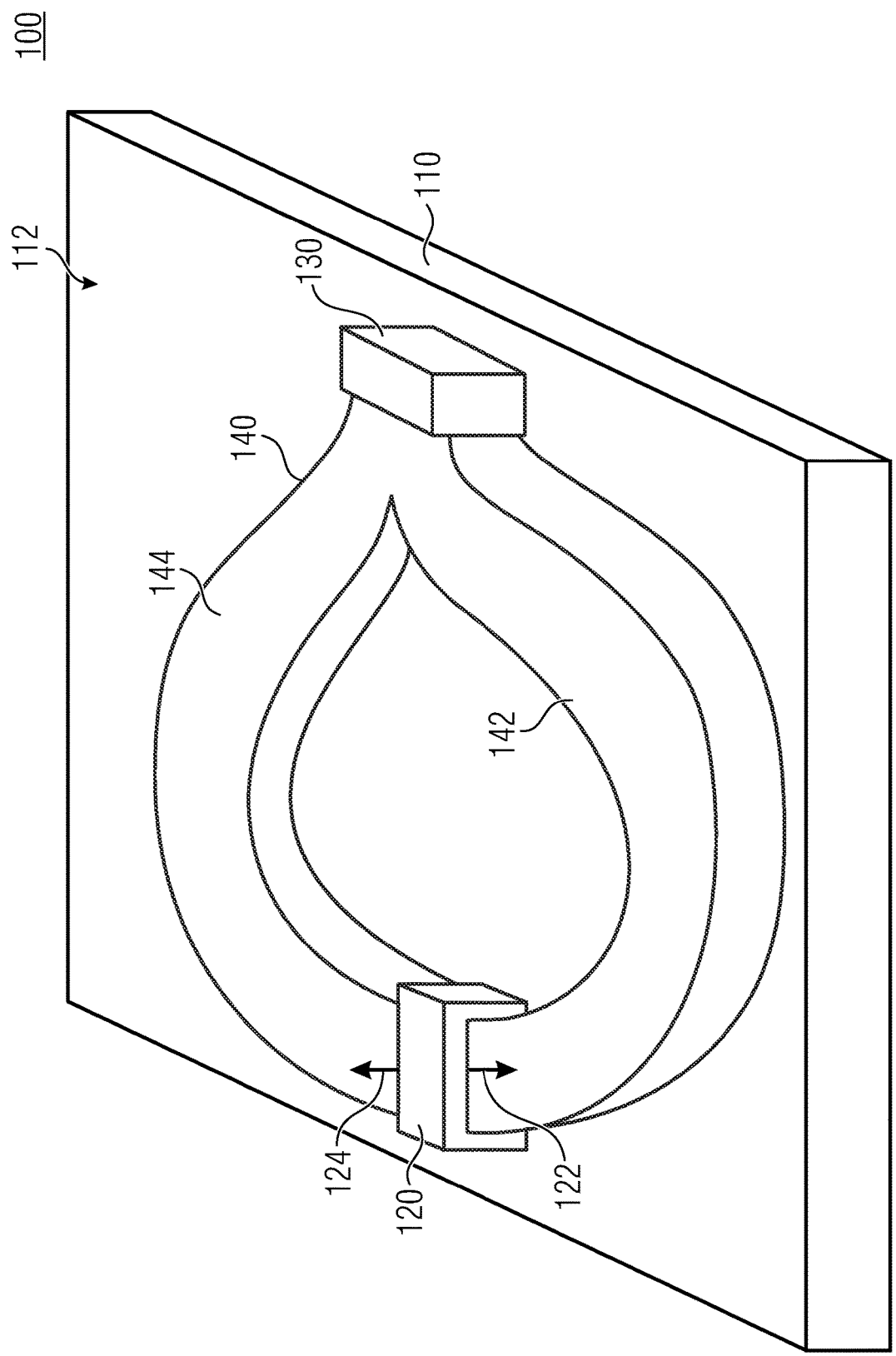
FIG. 1 shows a schematic view of a fluid sensor according to examples of the disclosure.

Equal or equivalent elements or elements with equal or equivalent functionality are denoted in the following description by equal or equivalent reference numerals even if occurring in different figures.

In the following description, a plurality of details is set forth to provide a more throughout explanation of examples of the present disclosure. However, it will be apparent to those skilled in the art that examples of the present disclosure may be practiced without these specific details. In other instances, well-known structures and devices are shown in block diagram form rather than in detail in order to avoid obscuring examples of the present disclosure. In addition, features of the different examples described herein after may be combined with each other, unless specifically noted otherwise.

FIG. 1 shows a schematic view of a fluid sensor according to examples of the disclosure. FIG. 1 shows fluid sensor 100 comprising a support structure 110 with a top main surface region 112, and arranged on the top main surface region 112 a thermal emitter 120 having a first and second radiation emission direction 122, 124, a thermal radiation detector 130 and a waveguide structure 140 having a first and second waveguide section 142, 144.

The thermal emitter emits thermal radiation in the first and second radiation emission direction 122, 124. Thermal radiation emitted in the first direction 122 is guided by the first waveguide section 142 of the waveguide structure 140 to the thermal radiation detector 130 and thermal radiation emitted in the second direction 124 is guided by the second waveguide section 144 of the waveguide structure 140 to the thermal radiation detector 130. The guided radiation, being the radiation guided in the first and second waveguide section, interacts while travelling from emitter to detector, with a surrounding fluid (not shown). Since the radiation is guided by the waveguide structure 140, an evanescence field of the guided radiation interacts with the fluid. The guided radiation is then detected by the thermal radiation detector 130. For example, from a priori data or theoretical analysis, an information about the surrounding fluid may then be determined based on the guided thermal radiation detected by the thermal radiation detector 130.

As shown in FIG. 1 the first and second waveguide section 142, 144 of the waveguide structure 140 may merge together, for example before being coupled or connected with the thermal radiation detector 130. However, according to further examples of the disclosure the first and second waveguide section 142, 144 may be coupled or connected individually, without merging together, to the thermal radiation detector 130.

According to further examples of the disclosure the thermal radiation detector 130 is configured to detect thermal radiation from at least two different detection directions parallel to the system plane. Furthermore, the first waveguide section 142 is configured to guide the first portion of the thermal radiation to the thermal radiation detector 130, such that the guided first portion of the thermal radiation is coupled in the thermal radiation detector 130 from a first detection direction of the at least two different detection directions of the thermal radiation detector and the second waveguide section 144 is configured to guide the second portion of the thermal radiation to the thermal radiation detector 130, such that the guided second portion of the thermal radiation is coupled in the thermal radiation detector 130 from a second detection direction of the at least two different detection directions of the thermal radiation detector 130.

By increasing the amount of detection area, electrical efficiency of the fluid sensor may be increased. Therefore, the guided radiation may be coupled to the thermal radiation detector from a plurality of detection directions. In comparison to a thermal radiation detector with only a single detection direction, more area of the detector 130 may be used in order to detect the guided radiation, and in addition, to allow for a better coupling of a plurality of waveguide sections 142, 144.

According to further examples of the disclosure the first and second radiation emission direction 122, 124 are opposite to one another and the first and second detection direction are opposite to one another. This arrangement of radiation and detection direction allows for a fluid sensor with a small footprint in the common system plane, but with increased efficiency because of an improved guiding of thermal radiation emitted by the thermal emitter 120.

Optionally, the first and second radiation emission direction 122, 124 may be parallel to the first and second detection direction. Radiation direction and detection direction are parallel to the common system plane. In the plane these directions may be anti-parallel, as the waveguide structure 140 allows to redirect the thermal radiation. Therefore, the thermal radiation detector 130 could also be rotated by an angle and/or the emitter 120 vice versa.

According to further examples of the disclosure the waveguide structure 140 comprises curved waveguides and/or rectangular waveguides. Curved waveguides and/or rectangular waveguides allow for an efficient guiding of thermal radiation while enabling a small footprint of the fluid sensor 100 in the common system plane. However, a plurality of shapes of the waveguide structure 140 may be used according to the specific application and spatial circumstances.

According to further examples of the disclosure the fluid sensor 100 comprises a filter structure and the filter structure is configured to filter the first and/or second portion of the thermal radiation emitted by the thermal emitter 120. Moreover, the waveguide structure 140 comprises the filter structure and/or the thermal emitter 120 comprises the filter structure and/or the thermal radiation detector 130 comprises the filter structure and/or the filter structure is arranged on the top main surface region 112 of the support structure 110 between the thermal emitter 120 and the waveguide structure 140 and/or between the thermal radiation detector 130 and the waveguide structure 140.

By filtering thermal radiation, filtered thermal radiation may be provided in a spectrum with an evanescence field that is sensitive for a specific surrounding fluid to be detected. Consequently, cheap thermal emitters 120 may be implemented, for example emitters that emit a broadband thermal radiation, wherein the thermal radiation is, adapted, or put easy 'tuned' via the filtering for a specific application, for example the detection, or the determination of a concentration of a particular fluid. The fluid may, for example, be $CO_2$ and/or CO and/or any other gas or liquid.

According to further examples of the disclosure, a fluid sensor may comprise an emitter 120, a wave guide (WG), a filter, and a detector 130 as components, and may be implemented according to the following principle:

Coupling broad band radiation to a waveguide structure 140 or WG;

Using a photonic crystal as a filter for specific wavelength (e.g., comprising etched holes);

Using evanescent field for non-dispersive spectroscopy as it interacts with an ambient fluid, e.g. gas;

Converting heat into an electric signal with the detector 130 (detector, for example in the form of a Piezo detector, a Diode detector, or other detector).

According to further examples of the disclosure the thermal emitter 120 comprises a semiconductor strip and the semiconductor strip is configured to emit a broadband thermal radiation, as the thermal radiation, in the at least two different radiation emission directions 122, 124, and the filter structure is an optical filter structure comprising a semiconductor material. In addition, the optical filter structure has a narrow transmission band and the optical filter structure is configured to filter the broadband thermal radiation, emitted in the at least two different radiation emission directions 122, 124.

A semiconductor strip as a thermal emitter 120 is a cheap, and easy to fabricate semiconductor element. In an easy to fabricate manner, such a semiconductor strip typically comprises more than one radiation direction 122, 124. With a waveguide structure 140 according to examples of the disclosure, a fluid sensor 100 may be produced with low costs, but with a good efficiency, because of the harvesting of thermal energy in multiple directions, along the common system plane of the sensor. A corresponding optical filter structure may be produced with low cost and in large numbers as well, and may be configured to provide a narrow band thermal radiation, adapted to determine an information about a surrounding fluid.

According to further examples of the disclosure the optical filter structure comprises a photonic crystal structure and/or a Bragg filter structure as wavelength selective optical elements. The photonic crystal structure may comprise etched holes in order to set specific filtering characteristics. Photonic crystal structure and/or a Bragg filter structures may be produced with low costs.

According to further examples of the disclosure the semiconductor strip comprises a doped polysilicon material to form a black body radiator and is configured to have, in an actuated condition, an operating temperature in a range between 500° C. and 900° C. The semiconductor strip comprising a doped polysilicon material may provide several advantages as it is an easy and cheap solution for the implementation of a thermal emitter 120. However, if high temperatures, or even temperatures above 900° C. are needed for an application the heater material may be substituted by a metal according to examples of the disclosure.

For example, for $CO_2$ sensing from a technical point of view a temperature of at least around 750° may be beneficial in order to have enough energy provided by the emitter 120 within the wavelength region of interest. In some applications, for example $CO_2$ sensing it may be: 'the hotter the better'. At around 850° C. or higher the poly-Silicon (Poly-Si) may need a protection to prevent the hot doped poly-Si from damage, e.g. by ambient oxygen. Therefore, according to examples of the disclosure the thermal emitter 120, for example in the form of the doped poly-Si may comprise a cover layer, e. g. a thin $SiO_2$ layer.

According to further examples of the disclosure the waveguide structure 140 is configured to provide an evanescent field ratio of the guided first and/or second portion of the thermal radiation of at least 5% and at most 90% or of at least 35% and at most 50%. The evanescent field ratio may, for example be around 43%, for example at least 30% and at most 60%. However, according to examples of the disclosure the fluid sensor 100, and for example in particular the waveguide structure 140, is/are configured to provide a high evanescent field ratio or in order words, an evanescent field ratio that is as high as possible, or 'as much as one can have'. One idea according to examples of the disclosure is to have the thermal radiation filtered to the correct wave length (small bandwidth), for example via the filter structure, and present as evanescent field in order to observe, for example as much as possible, damping by interaction with the surrounding fluid, for example an ambient gas. Furthermore, with regard to low evanescent field ratios, according to examples of the disclosure, the area, for example the footprint of the waveguide area in the common system plane, may be increased or may be maximized or may be large, in order to compensate the effect of a small evanescent field. In addition, if the value, e.g. the evanescent field ratio, gets too low, according to examples of the disclosure, a length of the waveguide or waveguide structure may be increased. However, this may be limited by the damping, e.g. the damping of the thermal radiation guided by the waveguide. In other words, examples of the disclosure may comprise a trade-off or may achieve a good compromise between evanescent field ratio, a length or size of the waveguide structure and a damping of the radiation. On the other hand, the waveguide structure 140 may be configured to provide an evanescent field ratio of the guided first and/or second portion of the thermal radiation of at most 90%.

According to further examples of the disclosure the support structure 110 comprises a rigid structure and a substrate on a bottom surface of the rigid structure. Moreover, a top surface, opposite to the bottom surface, of the rigid structure is the top main surface region 112 and the rigid structure is configured to confine the thermal radiation, radiated by the thermal emitter 120. The rigid structure may comprise $SiO_2$ and a nitride.

On goal of the arrangement of the fluid sensor is, for example, to guide as much thermal radiation, radiated by the thermal emitter 120, to the thermal radiation detector 130, wherein, in between the two, an evanescent field of the guided thermal radiation interacts with a surrounding fluid in order to determine an information about the fluid. Therefore, the rigid structure is configured to confine the thermal radiation, such that the thermal radiation does not leak through the support structure 11o. Therefore, according to examples of the disclosure rigid structures may be implemented, having mirror like properties. In some cases, it may be best, if the rigid structure would act like a mirror for the radiation guided through the waveguide structure 140. Consequently, the rigid structure may be configured to have a particular, for example 'correct' thickness and may be made of a particular, for example 'correct' materials, e.g. in order to fulfill this task. Additionally, or alternatively, two aspects may be fulfilled by the rigid structure:
1) The rigid structure may be configured, such that the exponential decay of the electric field guided through the waveguide structure 140 may happen inside the rigid structure. Therefore, there may be only minor or for example even no contact to the substrate.
2) As the top of rigid structure builds an interface to the bottom of the waveguide structure 140 a wrong choice of material (or material thickness) may increase losses of the waveguide structure. Therefore, the rigid structure may be made of materials, or of materials with a certain thickness, configured to decrease waveguide losses.

The support structure or the rigid structure of the support structure 110 may comprise or even be made of Nitride and $SiO_2$. However, these materials may be varied according to a specific application, in other words this may be a specific combination of materials.

The $SiO_2$ may act as etch stop layer for a backside cavity etch, e.g. a substrate cavity etch, and may decouple the sensor from the substrate (e.g., thermally and leakage current). The Nitride may provide or give, for example, some strength to the membrane (The addition of the Nitride may enable providing a good membrane in combination with the $SiO_2$) and may act or even act as a layer that contributes low losses to the waveguide, or the waveguide structure 140. The situation for or for example performance of the emitter 120, e.g. heater and/or detector 130 may be improved if the $SiO_2$ is etched away after backside etching in order to end up with a membrane formed just by Nitride.

In general, examples of the disclosure are not limited to specific materials that are underneath the waveguide or to certain layers that used to form the membranes. According to examples of the disclosure materials may be applied that are configured to decrease or to help to decrease the membrane thickness and introduce low losses to the waveguide.

According to one aspect of an example of the disclosure Nitride and $SiO_2$ may be suitable, but one could potentially define other layer compositions which keeps the sensor system the same or equivalent without leaving the scope of this disclosure.

According to further examples of the disclosure the substrate comprises at least one substrate cavity and the at least one substrate cavity is arranged vertically, with respect to the system plane, below the thermal emitter 120 and/or the thermal radiation detector 130 and/or the waveguide structure 140, for thermal insulation, of the thermal emitter 120 and/or the thermal radiation detector 130 and/or the waveguide structure 140, from the substrate. The cavities may be etched in the substrate. Therefore, adding cavities to the fluid sensor may be a cheap possibility to increase electrical efficiency because of less thermal radiation losses to the substrate.

According to further examples of the disclosure the fluid sensor 100 has a footprint in the system plane of less than 50 mm² or less than 40 mm² or less than 20 mm² and/or a height, wherein the height is orthogonal to the system plane, of less than 1000 μm or less than 450 μm or less than 400

μm. A footprint of the fluid sensor may, for example, be around 33-36 mm². Decreasing the thickness of the fluid sensor may increase the amount of chips on the wafer as an inter-chip-spacing could be reduced. Therefore, the fluid sensor may be produced with reduced costs.

According to further examples of the disclosure the waveguide structure 140 comprises at least one of a slab waveguide, a strip waveguide, a slot waveguide, a slot-array waveguide and/or a multi-slot waveguide; and/or the thermal radiation detector comprises at least one of a pyroelectric temperature sensor, a piezoelectric temperature sensor, a pn junction temperature sensor and/or a resistive temperature sensor. Choice of waveguides according to a specific application may enable a high evanescence field ratio. The choice of the detector may be based on production costs and required detection accuracy.

According to further examples of the disclosure at least one of the thermal radiation detector 130, the waveguide structure 140, the filter structure and/or the thermal emitter 120 is/are arranged monolithically on the support structure 11o. A monolithic fabrication allows for small dimensions of the fluid sensor 100, therefore saving space on a wafer and consequently costs. Furthermore, deposition processes may be used in order to produce such an arrangement. Such processes may be performed with low cost, and for high volume production.

Figure 2:
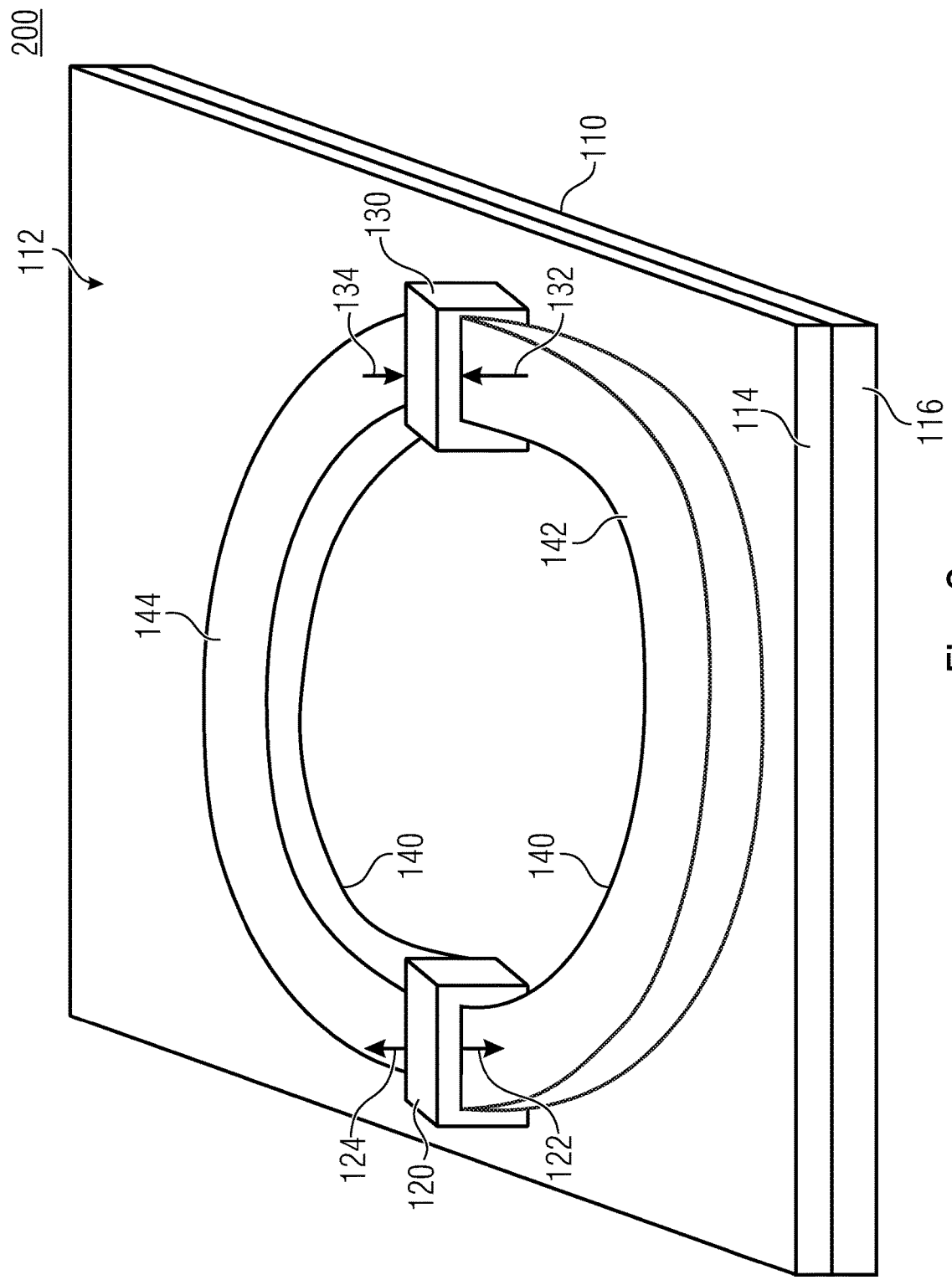
FIG. 2 shows a schematic view of a fluid sensor with a thermal detector having two different detection directions according to examples of the disclosure.

FIG. 2 shows a schematic view of a fluid sensor with a thermal detector having two different detection directions according to examples of the disclosure. Fluid sensor 200 comprises the elements explained with respect to FIG. 1. In contrast to FIG. 1, detector 130 comprises two different detection directions 132, 134 parallel to the system plane. Therefore, the first and second waveguide section 142, 144 do not merge, but are two separate elements of the waveguide structure 140. A first portion of the thermal radiation, emitted by the thermal emitter 120 in the first thermal radiation direction 122 is guided by the first waveguide section 142 to the detector 130, such that the guided first portion of the thermal radiation is coupled in the thermal radiation detector 130 from the first detection direction 132. A second portion of the thermal radiation, emitted by the thermal emitter 120 in the second thermal radiation direction 124 is guided by the second waveguide section 144 to the detector 130, such that the guided second portion of the thermal radiation is coupled in the thermal radiation detector 130 from the second detection direction 134. In FIG. 2 only two directions, for emission and detection are shown, however, a plurality of combinations of numbers of emission directions and detection directions are within the scope of this disclosure. Examples of the disclosure may comprise, for example an arrangement as shown in FIG. 2, but additionally with a third waveguide section inside the circular waveguide structure 140, as a part of said waveguide structure, guiding radiation from a third emission direction of the emitter 120 to a third detection direction of the detector 130. Furthermore, the amount of emission directions and the amount of detection directions may comprise an arbitrary ratio, in other words the number of emission directions does not have to be equal to the number of detection directions.

As shown in FIG. 2 the first and second radiation direction 122, 124 may be opposite to one another and the first and second detection direction 132, 134 may be opposite to one another. In addition, the first and second radiation emission direction 122, 124 may be parallel to the first and second detection direction 132, 134. However, relative positions of emission and detection directions may be chosen arbitrarily, for example according to the available space in a certain application. Using the waveguide structure 140, a plurality of paths may be achieved, connecting emitter 120 and detector 130. Therefore, a plurality of arrangements is possible, benefitting from the concept according to examples of the disclosure, to increase energy efficiency, by harvesting thermal radiation from the emitter 120 from multiple emission directions via the waveguide structure 140.

In order to guide the thermal radiation, the waveguide structure 140 may comprise curved waveguides, as shown in FIG. 2 or, for example rectangular waveguides. However, as mentioned before, a plurality of shapes may be chosen in accord to a specific application, and, for example, in particular with respect to the available space on a chip surface.

Additionally, as an optional feature, FIG. 2 shows the support structure 11o comprising a rigid structure 114 and a substrate 116. The substrate 116 is arranged on a bottom surface of the rigid structure 114 and a top surface, opposite to the bottom surface, of the rigid structure 114 is the top main surface region 112. The rigid structure 114 is configured to confine the thermal radiation, radiated by the thermal emitter 120. In order to increase the efficiency of the fluid sensor 200, radiation losses into the substrate 116 can be hampered. Therefore, the rigid structure 114 may comprise a specific material and/or a specific thickness in order to hinder or stop the thermal radiation from being absorbed by the substrate. Put in simple words, the rigid structure 114 may be configured to keep the thermal radiation above the top surface region 112. Or in other words, the rigid structure may be configured to keep the thermal radiation inside the waveguide structure 140 and/or to block a potential thermal radiation emission direction of the thermal emitter 120 pointing towards the substrate. In addition, losses at the detector 130 may be reduced as well.

Figure 3:
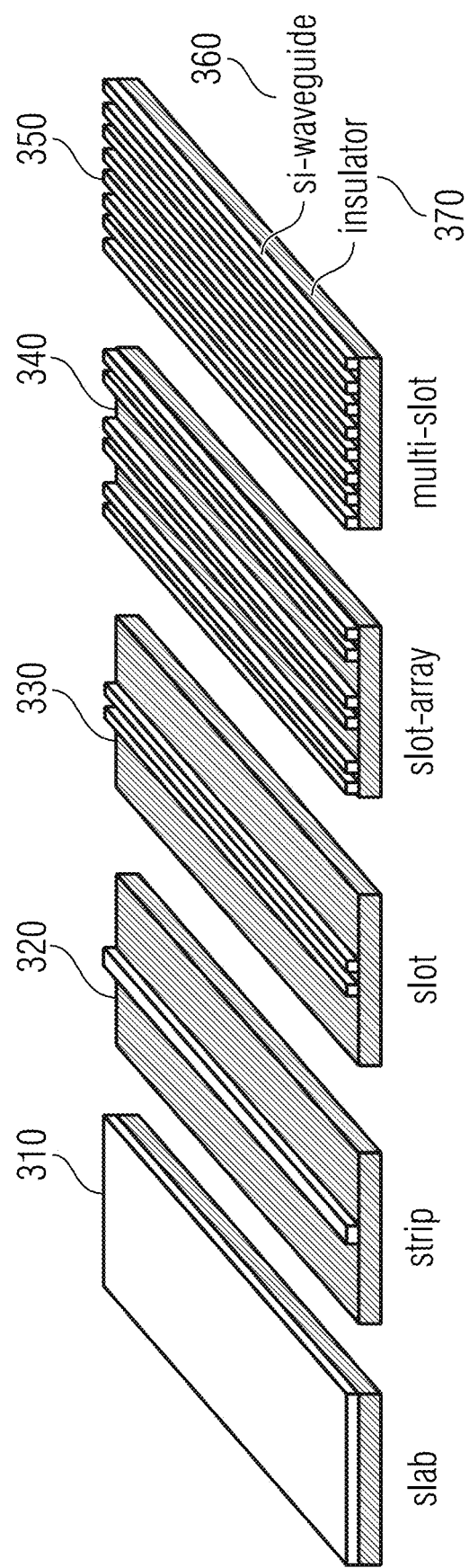
FIG. 3 shows a schematic view of possible implementations of the waveguide structure according to examples of the disclosure.
Figure 3:
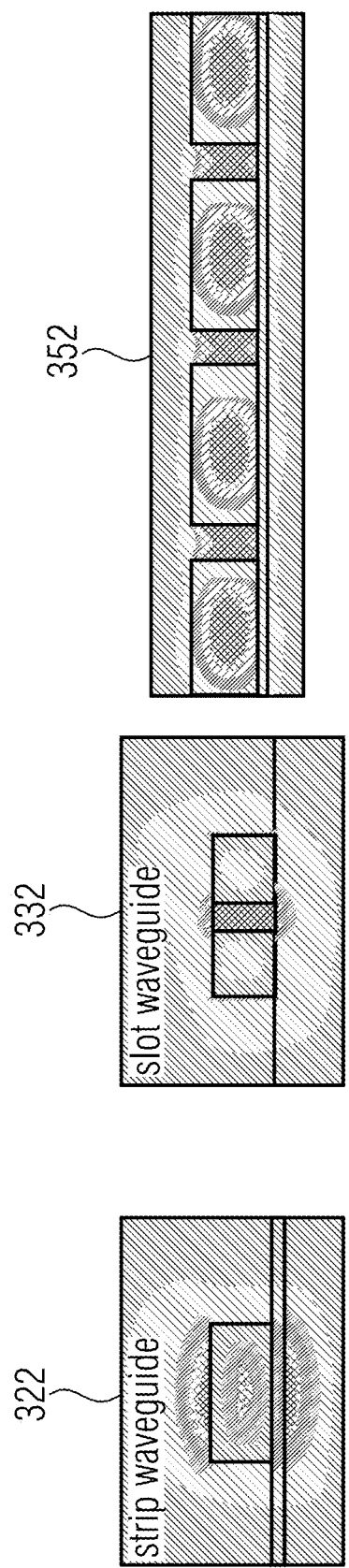

FIG. 3 shows a schematic view of possible implementations of the waveguide structure 140 according to examples of the disclosure. FIG. 3 shows from left to right a slab waveguide 310, a strip waveguide 320, a slot waveguide 330, a slot-array waveguide 340 and a multi-slot waveguide 350. As an example, the waveguides may comprise an insulator 360 on which the slab, the strips and/or the slots are arranged comprising Si 370. In other words, the waveguides may be Si-waveguides. As an example, FIG. 3 shows schematic electric field distributions 322, 332, 352 of an evanescent field of thermal radiation for a strip waveguide (322), for a slot waveguide (332) and for a multi-slot waveguide (352). The colors represent the respective values of the field strength, with red being a high value, and blue being a low value.

As an example, a multi-slot waveguide 350 may provide an evanescent field ration of ~40%, with a damping of ~2-4 cm-1. However, other evanescent field ratios may be implemented. For example, the waveguide structure may be configured to provide an evanescent field ratio of the guided first and/or second portion of the thermal radiation of at least 5% and at most 90%. Although increasing the evanescent field ratio may be improving the electric efficiency of the fluid sensor, in some cases it may not be possible to use a waveguide providing a high ratio. Therefore, according to examples of the disclosure an area of the waveguide structure 140 may be increased in order to allow for a sufficient interaction between evanescent field of the guided radiation and surrounding fluid, for example in order to determine an information about the surrounding fluid. However, both effects may be used to provide a highly efficient fluid sensor 200, having a waveguide structure 140 with a large evanescence field ratio and a large area that is in contact with a surrounding fluid.

Figure 4:
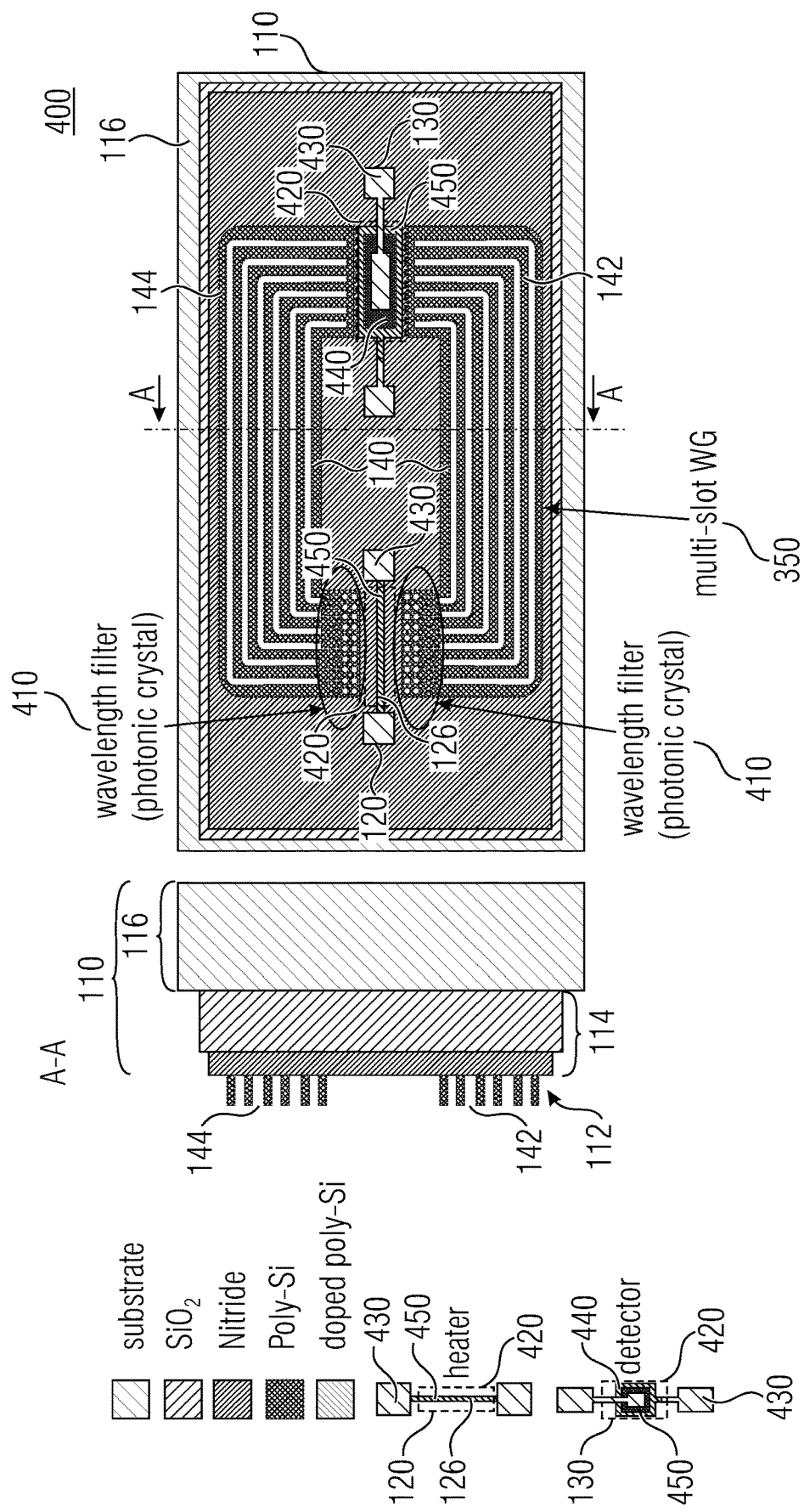
FIG. 4 shows a schematic view of a fluid sensor comprising a filter structure according to examples of the disclosure.

FIG. 4 shows a schematic view of a fluid sensor comprising a filter structure according to examples of the disclosure. FIG. 4 shows fluid sensor 400, in a schematic top view and a cross section through section A-A (shown with the dash/dotted line). Fluid sensor 400 comprises a support structure 110, the support structure comprising a rigid structure 114 and a substrate 116. As an example, the rigid structure 114 comprises a layer of $SiO_2$, facing towards the substrate and on the layer of $SiO_2$ a layer of Nitride, wherein a surface of the Nitride opposite to the substrate is the top main surface region 112. The fluid sensor 400 further comprises a thermal emitter 120, a thermal radiation detector 130, and a waveguide structure 140, the waveguide structure 140 comprising a first and second waveguide section 142, 144. As an example, the waveguide structure comprises multi-slot waveguides 350 comprising optionally Poly-Si 450. The arrangement is similar to the fluid sensor 200 of FIG. 2, therefore first and second radiation emission directions and first and second detection direction may be analogously to fluid sensor 200. In contrast to the fluid sensor 200 of FIG. 2 fluid sensor 400 comprises a filter structure 410. As an example, the filter structure 410 is shown as a wavelength filter (photonic crystal with etched holes).

The filter structure 410 is configured to filter the first and/or second portion of the thermal radiation emitted by the thermal emitter 120. As explained before, the filter structure 410 may adjust the wavelength of the thermal radiation, such that a detection of a surrounding fluid may be improved. The thermal emitter 120 may be a broadband thermal radiation emitter, configured to emit the broadband thermal radiation, and the filter structure 410 may comprise a narrow transmission band, around a specific wavelength, wherein a surrounding fluid interacts with an evanescence field of the filtered thermal radiation, guided by the waveguide structure 140, in order to determine an information about the surrounding fluid.

The filter structure 410 may be arranged, as shown in FIG. 4, between the thermal emitter and the waveguide structure 140. However, the waveguide structure 140 may comprise the filter structure 410 and/or the thermal emitter 120 may comprise the filter structure 410 and/or the thermal radiation detector 130 may comprise the filter structure 410 and/or the filter structure 410 may be arranged on the top main surface region 112 of the support structure 110 between the thermal radiation detector 130 and the waveguide structure 140. Consequently, unfiltered, guided thermal radiation may interact with a surrounding fluid, and said thermal radiation may be filtered by the filter structure 410, for example with the filter structure being part of the detector 130, or for example being arranged between the waveguide structure 140 and the detector 130, in order to filter out portions of the thermal radiation that may have been interacted with a second surrounding fluid that is not to be determined. Therefore, only a portion of the thermal radiation in a certain spectrum, for example sensitive to a fluid that is to be determined, may reach the detector 130. The filter structure 410 may optionally comprise, as shown, etched holes, in order to provide filter characteristics.

Furthermore, at least one of the thermal radiation detector 130, the waveguide structure 140, the filter structure 410 and/or the thermal emitter 120 may be arranged monolithically on the support structure 11o. In addition, FIG. 4 shows the thermal emitter 120 isolated, in detail, apart from fluid sensor 400, as well as the thermal radiation detector 130. This is only for a visualization in detail of emitter 120 and detector 130.

As an example, the thermal emitter 120 comprises a semiconductor strip 126, comprising a doped poly-Si material 450. The thermal emitter 120 may be, as optionally shown, a heater. The detector may comprise, as optionally shown, for example in an area of the detector configured to detect radiation, a doped poly-Si material 450, as well as an AlN/AlScN (AlN and/or AlScN) material 440, e.g., as a piezo material. As another optional feature, the emitter 120 and the detector 130 comprise support and/or contact portions 430, for example comprising AlSiCu, supporting the semiconductor strip 126 in the case of the emitter 120 and the area that is configured to detect thermal radiation, in the case of the detector 130, e.g., to provide for an electrical connection of the detection area of the detector and the support and/or contact portions 430. The support and/or contact portions 430 may be used for contacting, e.g., for providing a current for heating the semiconductor strip 126 for the emitter 120 and/or for detecting a voltage induced by the heating of the doped poly-Si 450 of the detector 130. However, the fluid sensor 400 is neither limited to that specific filter, the specific waveguides, nor to the specific materials used. In addition, the heater 120, the WG(s) 140, the filter 410, and the detector 130 may form sub-systems of the fluid sensor 400.

To put it in other words, in general, the thermal emitter 120, according to examples of the disclosure, may comprise a semiconductor strip 126 and the semiconductor strip 126 may be configured to emit a broadband thermal radiation, as the thermal radiation, in the at least two different radiation emission directions. In this case, the filter structure 410 may be an optical filter structure comprising a semiconductor material and the optical filter structure may have a narrow transmission band and the optical filter structure may be configured to filter the broadband thermal radiation, emitted in the at least two different radiation emission directions.

Moreover, the semiconductor strip 126 may comprise the doped polysilicon material 450 to form a black body radiator. The semiconductor strip may be configured to have, in an actuated condition, an operating temperature in a range between 500° C. and 900° C. The semiconductor strip 126 may comprise a cover layer, to protect the strip at high temperatures from damage. A $SiO_2$ layer may be deposited on the strip, to protect the polysilicon from oxygen.

The dashed lines around the semiconductor strip 126 and the main part of the detector 130 indicate the optional use of a backside Bosch Process 420, in order to produce the beforementioned elements. However, this process is only optional, and therefore fluid sensors as shown in FIGS. 1, 2 and 4 may be fabricated in any suitable manner. For example, other deep reactive-ion etching processes or modifications thereof may be used in order fabricate the emitter 120 and/or the detector 130. In general, according to examples of the disclosure, emitter 120 and/or detector 140 may comprise a geometry with steep-sided trenches, fabricated via etching. Therefore, emitter 120 and detector 140 may comprise high aspect ratios.

Figure 5:
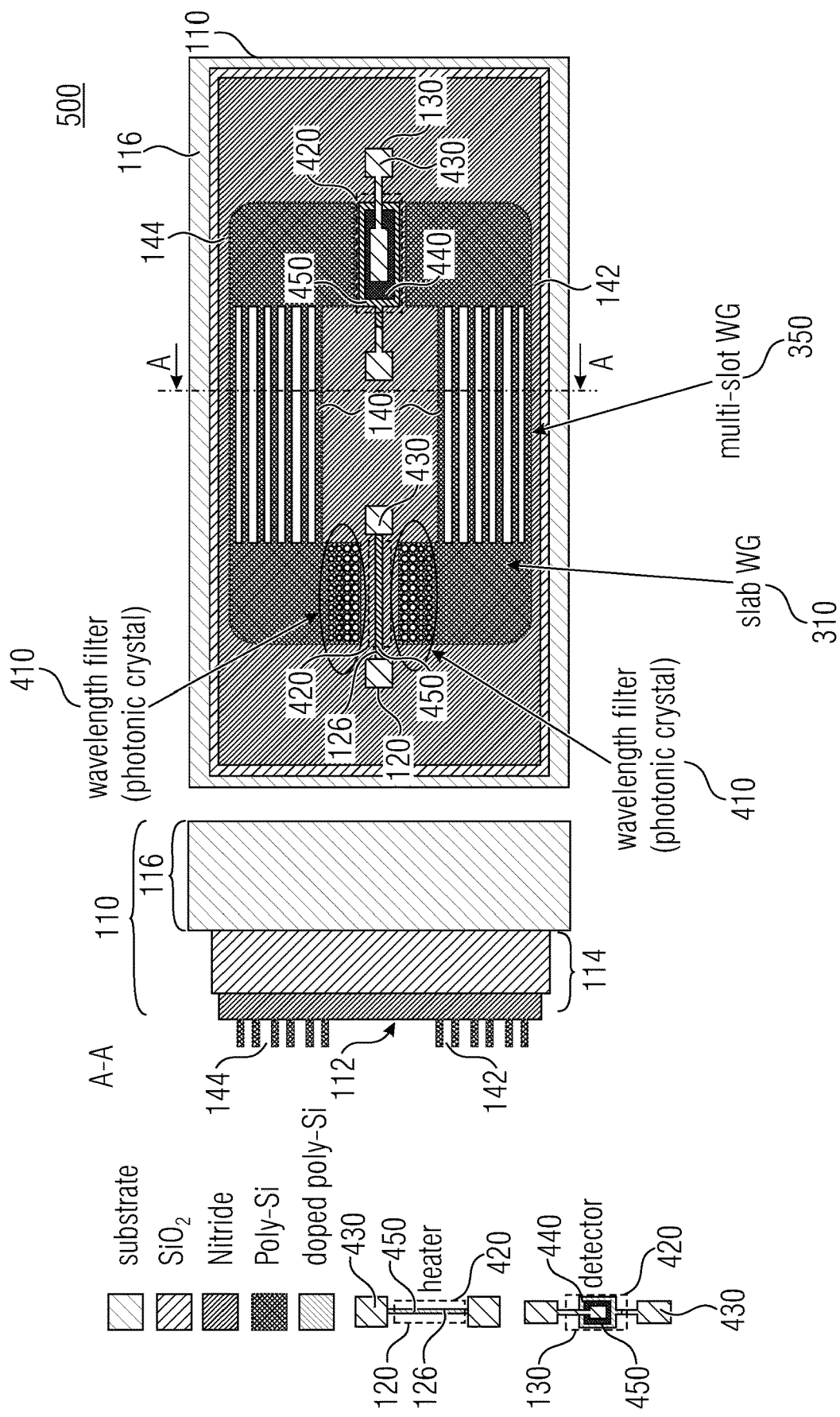
FIG. 5 shows a schematic view of the fluid sensor of FIG. 4 with a combination of different waveguides, according to an example of the disclosure.

FIG. 5 shows a schematic view of the fluid sensor of FIG. 4 with a combination of different waveguides, according to an example of the disclosure. Fluid sensor 500 is identical to fluid sensor 400, apart from the waveguide structure 140. Waveguide structure 140 comprises multi-slot waveguides 350 and slab waveguides 310. Sections of the waveguide structure 140 may comprise a specific form of waveguide according to its geometry. In the areas of the slab waveguide 310, the guided radiation has to follow a small curve radius. Therefore, energy losses may occur. In addition, a slab waveguide may be easier to produce for such geometries. On the other hand, according to electric field distribution 352 in comparison to distribution 322, multi-slot waveguides may provide advantages with respect to an evanescence field outside the slots of the waveguide, in order to allow interaction with a surrounding fluid. Consequently, according to examples of the disclosure, a combination of waveguides may be implemented for the waveguide structure 140, according to the specific requirements. Any combination of waveguides, for example of the waveguides presented in FIG. 3, may be applied. As a result, examples according to the disclose provide large degrees of freedom in design to adapt to specific requirement, while still being able to provide an increased efficiency, by improving the amount of thermal radiation guided from the emitter 120 to the detector 130.

The footprint in the system plane of a fluid sensor according to an example of the disclosure, for example of any of the fluid sensors 100, 200, 400 may be of less than 50 mm$^2$ or less than 40 mm$^2$ or less than 20 mm$^2$ and/or a height, wherein the height is orthogonal to the system plane, may be of less than 1000 μm or less than 500 μm or less than 450 μm.

Figure 6:
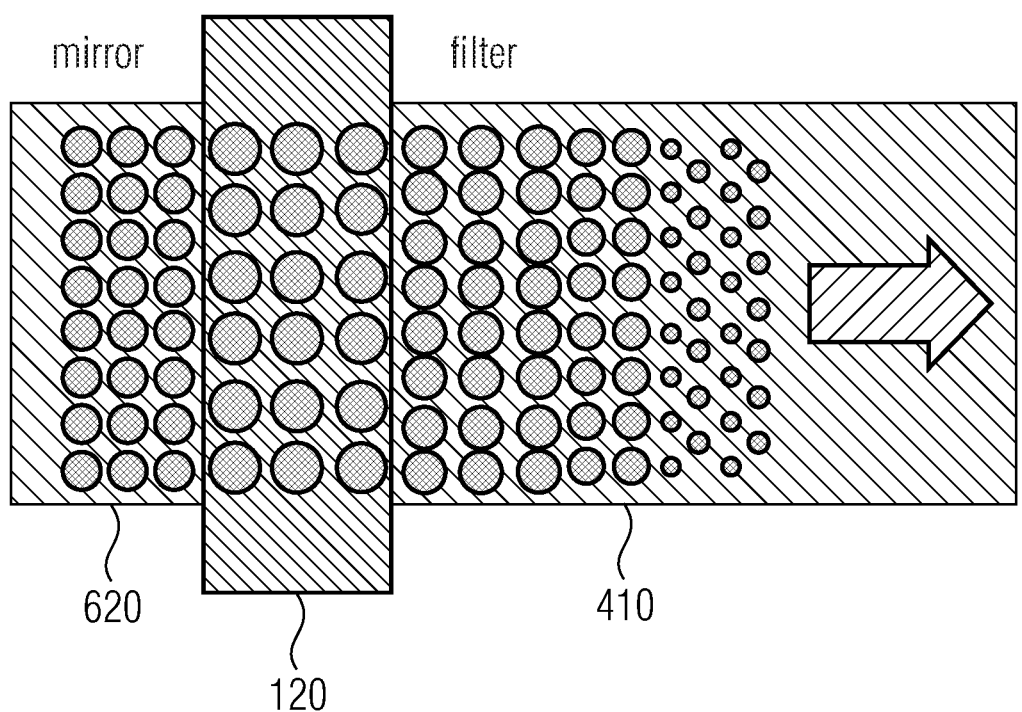
FIG. 6 shows a schematic view of a photonic crystal emitter as an example of a combination of a thermal emitter and a filter structure according to an example of the disclosure.

FIG. 6 shows a schematic view of a photonic crystal emitter as an example of a combination of a thermal emitter 120 and a filter structure 410 according to an example of the disclosure. Photonic crystal emitter 610 comprises a thermal emitter 120 and a filter structure 410. Therefore, the photonic crystal emitter 610 may be configured to emit filtered radiation. The thermal emitter 120 may be an implanted strip through which a current may flow, therefore this particular strip may get hot and emit the radiation. Therefore, thermal emitter 120 may be the driven and/or intentional heated/emitting part of the photonic crystal thermal emitter. As an optional feature, for example in order to focus radiation in one direction, e.g. in a first radiation emission direction of a plurality of radiation emission directions, photonic crystal emitter 61o optionally comprises a mirror 620. Mirror 620 may increase the efficiency of the emitter. As an example, e.g. for a better understanding, if one thinks of a mirror part 620 that has some distance to the implanted area 120 and a filter 410 that also has some distance, e.g. to the implanted area and/or the mirror, that it would be clear separated, or for example then the photonic crystal emitter 61o may be clearly separated, into photonic crystal mirror 620, thermal emitter 120 and photonic crystal filter 410. As an example, the photonic crystal emitter 61o, e.g. photonic crystal thermal emitter may comprise a thermal emitter 120 in the form of an implanted area or implanted strip, a photonic crystal filter 410 and optionally a photonic crystal mirror 620.

An arrangement as explained before, may be implemented with a thermal emitter 120 having two or more radiation emission directions, wherein the radiation emission direction shown in FIG. 6 is a first radiation emission direction, which is not opposite to one of the other radiation emission directions in the same plane. A setup with mirrors may be implemented for a three-dimensional setup, with radiation directions, that are not parallel to the system plane. However, a second radiation emission direction may be directed in the system plane, but not opposite for shown first radiation emission direction, e.g., with an angle in the system plane of 90°. However, for the sake of convenience only one radiation emission direction (indicated with an arrow) is shown in FIG. 6. The phonic crystal emitter 610 comprises etched holes for filtering and to provide the mirror characteristics. Input power of the photonic crystal emitter may be ~100 mW (for example having a length of 500 μm, and at @~750K). A band width of radiated emission may be ~800 nm.

In addition or alternatively to comprising a phonic crystal structure, for example as shown in FIG. 6, the filter structure 410 may comprise a Bragg filter structure as a wavelength selective optical element.

Figure 7:
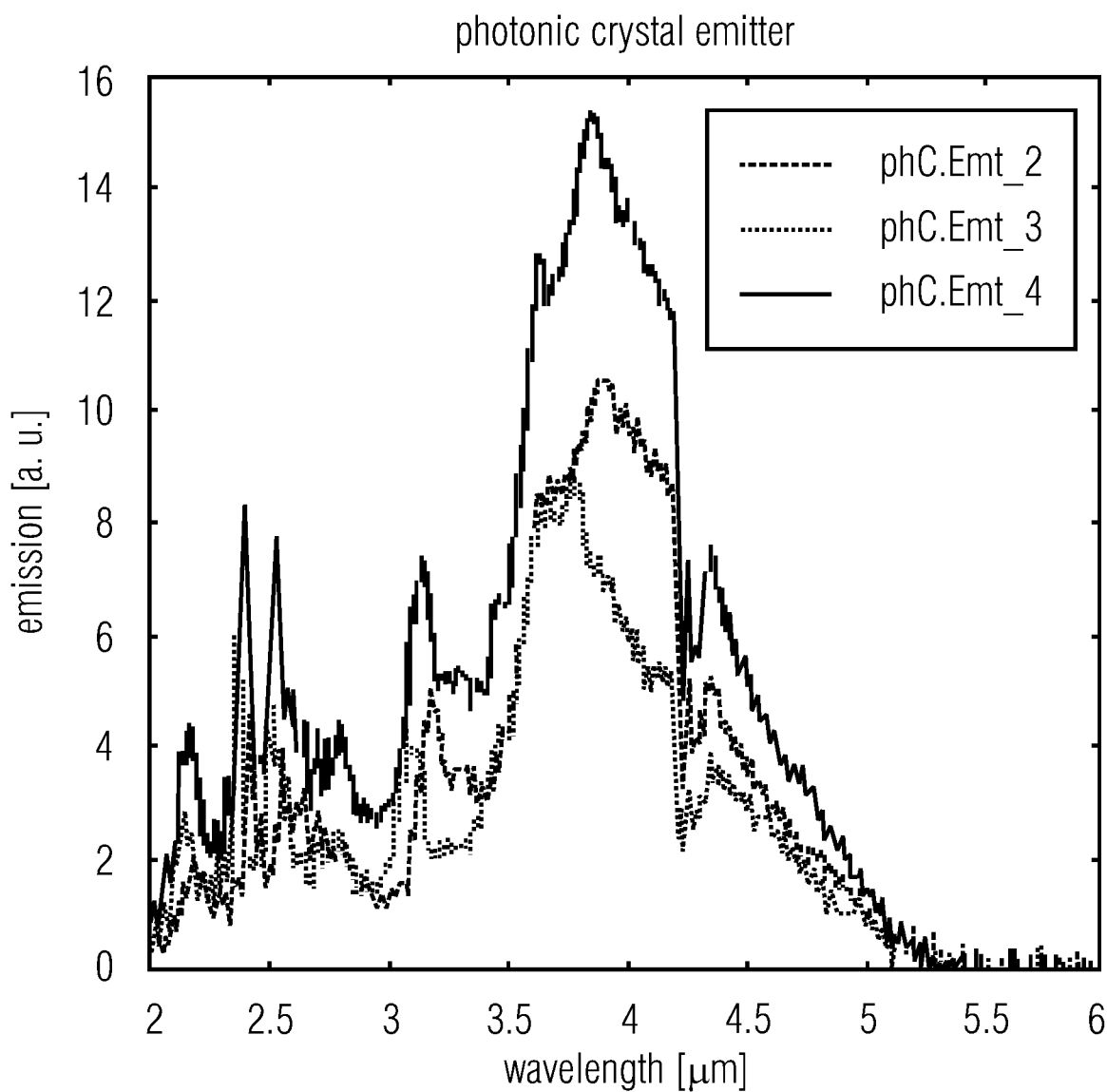
FIG. 7 shows an example of a plot of emissions of photonic crystal emitters over the wavelength according to examples of the disclosure.

FIG. 7 shows an example of a plot of emissions of photonic crystal emitters over the wavelength according to examples of the disclosure. FIG. 7 may show emissions of photonic crystal emitters 610 as shown in FIG. 6 with or without mirror 620. All three emission plots show distinct peaks in arbitrary units (a.u.) around approximately 3.75 μm. A surrounding fluid may interact with the evanescence field of the guided thermal radiation around said wavelength. Therefore, by detecting the guided filtered thermal emission, an information about the surrounding fluid, e.g. its concentration, may be determined.

Figure 8:
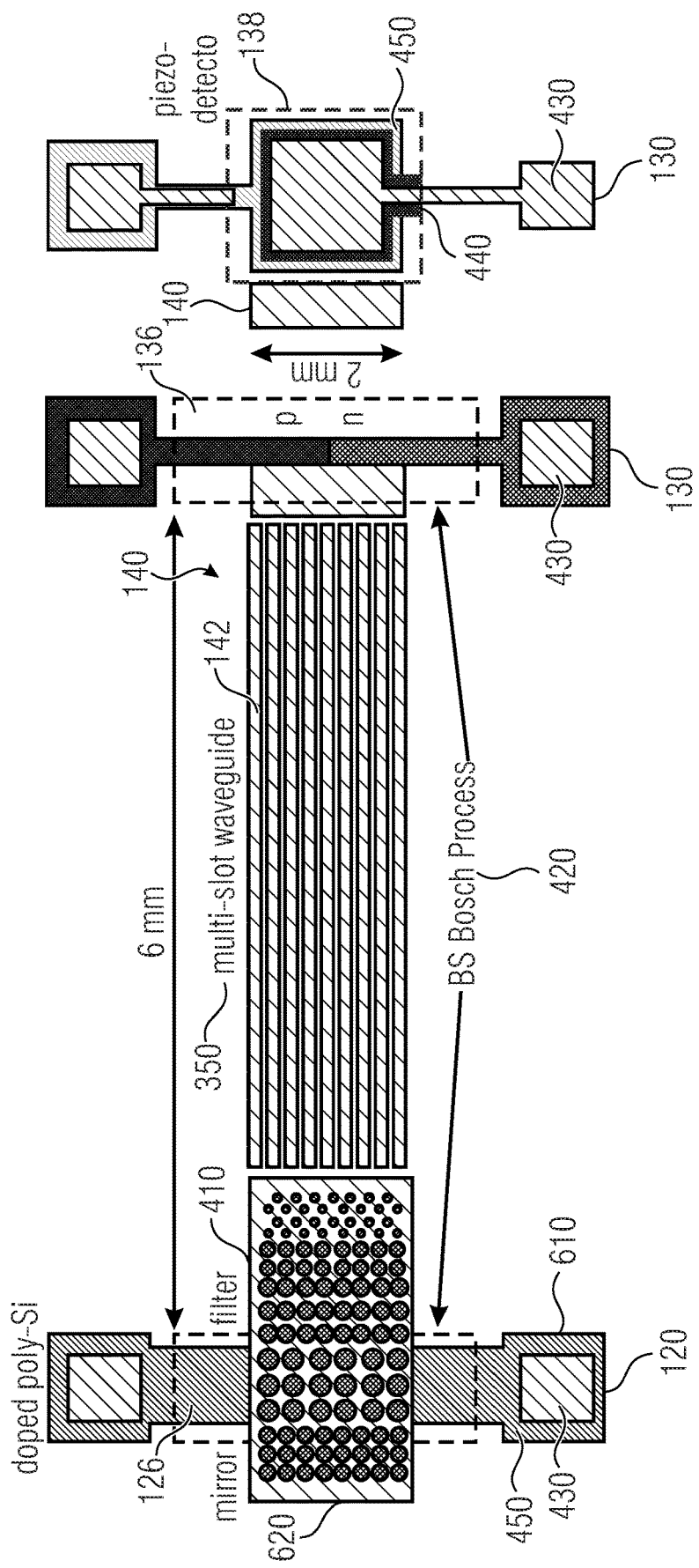
FIG. 8 shows a schematic view of one portion of a fluid sensor according to examples of the disclosure.

FIG. 8 shows a schematic view of one portion of a fluid sensor according to examples of the disclosure. FIG. 8 may show an integrated or even fully integrated system or fluid sensor system. FIG. 8 shows a photonic crystal emitter 610 comprising an emitter 120 and a filtering structure 410. The thermal emitter 120 comprises support and/or contact portions 430, a semiconductor strip 126 and a doped Poly-Si material 450. The filter structure 410 optionally comprises a mirror 620. Alternatively, instead of the mirror 620 another filtering portion of the filter structure 410 may be arranged at the mirror's place, and the emitter 120 may be configured to radiate emission in another radiation emission direction, wherein the other radiation direction is arranged at or is pointing towards the current position of the mirror 620. The phonic crystal emitter 610 comprises etched holes for filtering and to provide the mirror characteristics. FIG. 8 shows only a first waveguide section 142 of the waveguide structure 140, which is a multi-slot waveguide 350. The second waveguide section as well as the second radiation direction are not shown for convenience. The fluid sensor further comprises detector 130, being optionally, a pn junction temperature sensor 136. The detector 120 comprises additionally support and/or contact portions 430. As an example, the distance between emitter 120 and detector may be 6 mm. As another example, the width of the waveguide section 142, parallel to the common system plane, may be 2 mm.

On the right-hand side of FIG. 8 an optional detector 130 is shown which may replace the pn junction temperature sensor. Detector 130 is piezo-detector 138, or a piezoelectric temperature sensor. According to examples of the disclosure, the system can use a pn-junction temperature detector 136 or piezo-detector 138; in principle the detectors can, for example, be replaced 1:1. Optionally, Detector 138 may be a pyro-detector. Piezo-detector 138 comprises optionally support and/or contact portions 430, a radiation absorption layer, e.g. comprising a doped Poly-Si material 450 and a detection layer, e.g. a piezo layer, as an example comprising an AlN/AlScN material 440. The emitter 120 and the detectors 136 or 138 may be formed via a backside Bosch Process 420. In order to increase the resolution of fluid sensors according to the disclosure, the sensor size may be increased (e.g., increasing the area of the waveguide structure in addition or correspondingly).

Figure 9:
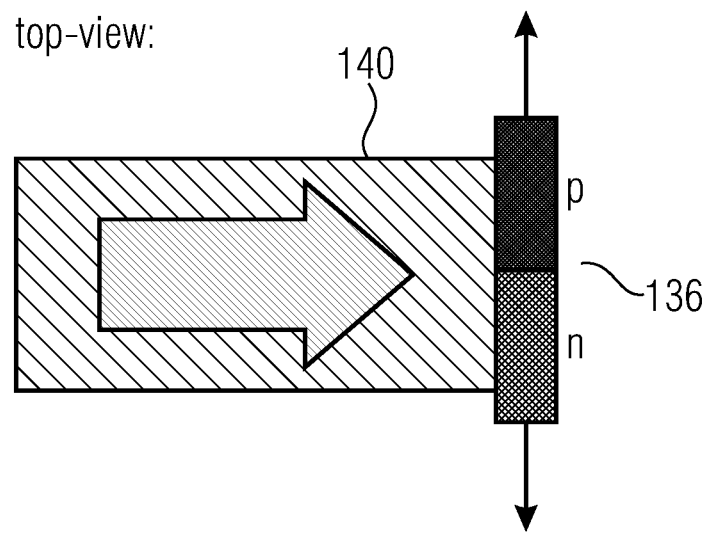
FIG. 9 shows a schematic top view of the pn junction temperature sensor of FIG. 8.

FIG. 9 shows a schematic top view of the pn junction temperature sensor 136, e.g. a diode, of FIG. 8, with the waveguide structure 140 guiding radiation (represented by arrow) into the detector 136. The sensor may, for example, have a noise equivalent power (NEP) of 1.7e-7 W/Hz$^{1/2}$. A pn junction temperature sensor, e.g. a diode may be processed in a simple way, with low effort and cost.

Figure 10:
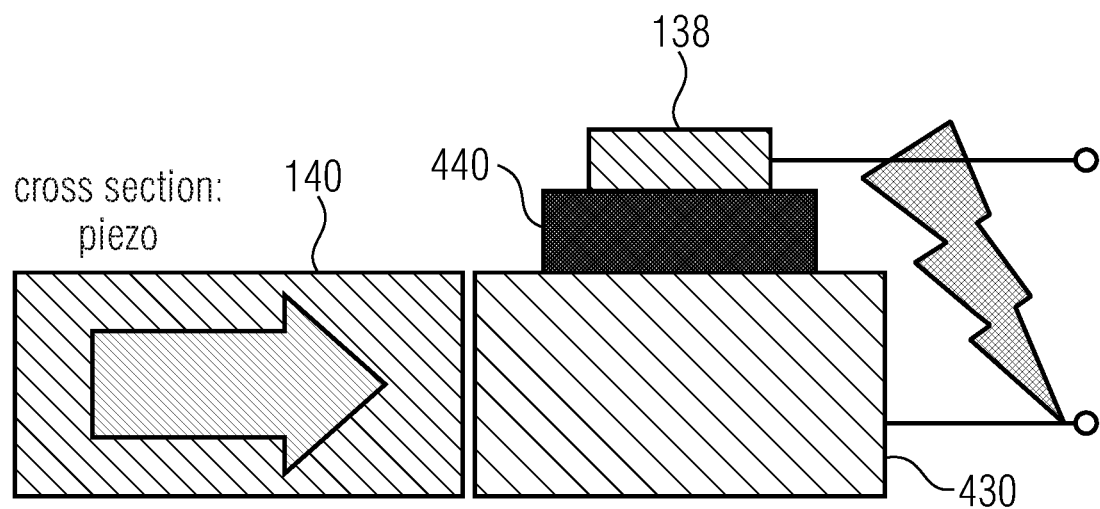
FIG. 10 shows a schematic sideview of the piezo-detector of FIG. 8.

FIG. 10 shows a schematic sideview of the piezo-detector of FIG. 8. FIG. 10 shows waveguide structure 140 guiding radiation (represented by arrow) into the detector 138. The radiation may heat an absorption layer, e.g., comprising a doped Poly-Si material (not shown). Via the heating of the absorption layer and the detection layer, e.g. comprising an AlN/AlScN material 440, a voltage may be measured between the support and/or contact portions 430. Upper and lower support and/or contact portions represent the support portions of the piezo-detector 138 of FIG. 8. The piezo detector may have a better performance than a pn junction sensor. The sensor may, for example, have a noise equivalent power of 5e-9 W/Hz$^{1/2}$. Optionally, the arrangement shown in FIG. 10 may provide a pyro-detector.

Figure 11:
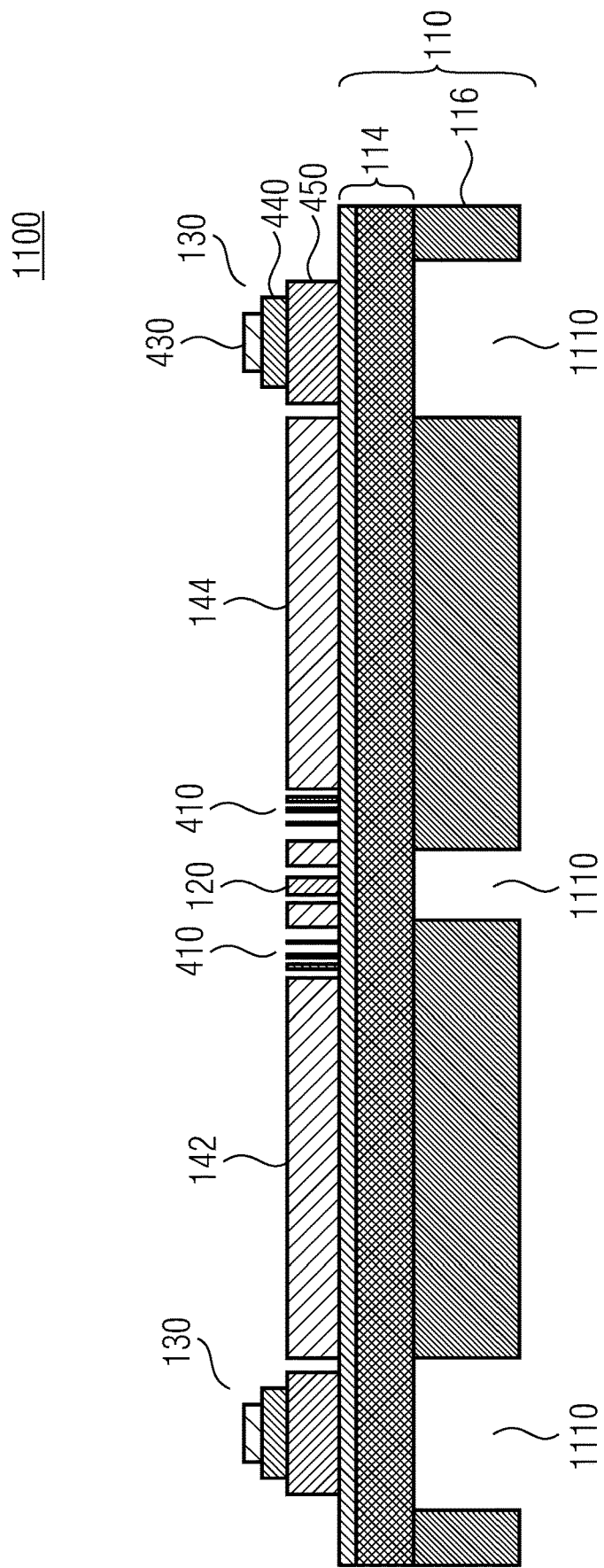
FIG. 11 shows a schematic side view of a fluid sensor with substrate cavities according to examples of the disclosure.

FIG. 11 shows a schematic side view of a fluid sensor 1100 with substrate cavities according to examples of the disclosure. FIG. 11 is a schematic unfolded side view of fluid sensor 400 of FIG. 4 with substrate cavities 1110. Emitter 130 is shown twice on each end of the side view of fluid sensor 1100, however as shown in FIG. 4 it is only one emitter 130. Put in simple words, FIG. 11 shows the same arrangement as FIG. 4 but with detector 130 cut in half and straightened around the emitter 120. This perspective is shown in order to highlight the placement of the substrate cavities 1110 underneath emitter 120 and detector 130.

In general, the substrate may comprise at least one substrate cavity 1110 and the at least one substrate 1110 cavity may be arranged vertically, with respect to the system plane, below the thermal emitter 120 and/or the thermal radiation detector 130 and/or the waveguide structure 140, for thermal insulation, of the thermal emitter 120 and/or the thermal radiation detector 130 and/or the waveguide structure 140, from the substrate 116.

Figure 12:
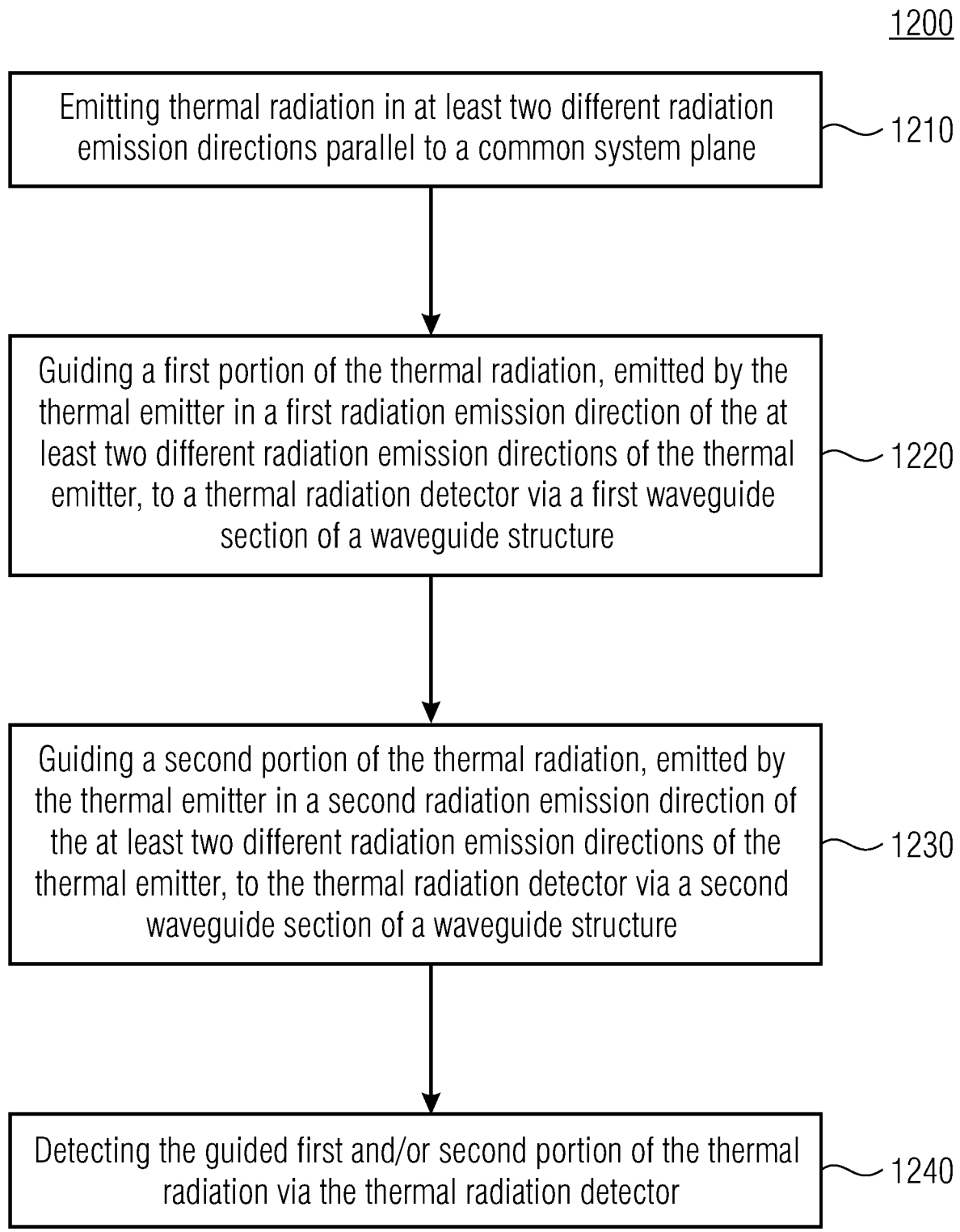
FIG. 12 shows a method for detecting guided thermal radiation according to examples of the disclosure.

FIG. 12 shows a method for detecting guided thermal radiation according to examples of the disclosure. Method 1200 comprises emitting 1210 thermal radiation in at least two different radiation emission directions parallel to a common system plane, wherein the common system plane is formed by a top main surface region of a support structure, and wherein the thermal radiation is emitted by a thermal emitter arranged on the top main surface region of the support structure. The method 1200 further comprises guiding 1220 a first portion of the thermal radiation, emitted by the thermal emitter in a first radiation emission direction of the at least two different radiation emission directions of the thermal emitter, to a thermal radiation detector via a first waveguide section of a waveguide structure, such that an evanescence field of the guided first portion of the thermal radiation interacts with a fluid that is surrounding the waveguide structure and guiding 1230 a second portion of the thermal radiation, emitted by the thermal emitter in a second radiation emission direction of the at least two different radiation emission directions of the thermal emitter, to the thermal radiation detector via a second waveguide section of a waveguide structure, such that an evanescence field of the guided second portion of the thermal radiation interacts with the fluid that is surrounding the waveguide structure. The thermal radiation detector and the waveguide structure are arranged on the top main surface region of the support structure. Moreover, method 1200 comprises detecting the guided first and/or second portion of the thermal radiation via the thermal radiation detector.

According to further examples of the disclosure the fluid sensor may comprise a thermal emitter which is thermally decoupled and has low thermal capacity (e.g., placed on a very thin membrane), a wave guide, a filter system, and a thermal detector which is thermally decoupled and has low thermal capacity (e.g., placed on a very thin membrane)

In the following another key aspect of examples of the disclosure is explained for a, e.g., particular case of application, using a thermal emitter as, for example approximately, black body radiator to generate radiation in mid-infrared. The aim of such an application may be coupling radiation into a waveguide (WG) and filtering the same. The aim may therefore comprise narrow-band filtering of the wavelength in the WG around e.g., 4.26 μm wavelength (e.g., for absorption of $CO_2$ in air). As an example, for emitting this wavelength range with sufficiently strong power, an emitter temperature of approximately 500° C.-900° C. has to be obtained.

Especially because the emitter would have to be so hot to provide the wavelength range of interest for the application with sufficient intensity, any improvement of efficiency regarding the emitter may be important. Any coupling losses, imperfections in the WG or filter or unused radiation of the emitter may be problematic. An approach according to examples of the disclosure of having a waveguide structure or one WG for the connecting path between an emitter and detector may be implemented with low coupling losses. On the other hand, the great advantage of a WG may be the "maneuverability of radiation". Thus, the radiation that is actually emitted in the "wrong" spatial direction (not in the direction of the detector) can also be used.

Examples according to the disclosure allow usage of radiation of a thermal emitter that is highly efficient, e.g. as efficient as possible, by purposeful usage of WGs. Many variations of this scheme are possible and can fulfill the same purpose.

According to further examples of the disclosure, the purpose is to use the radiation of the emitter laterally and to produce a monolithic sensor. For using as much spherical angle of the radiation or surface of the emitter as possible, the usage of WGs in a scheme according to the disclosure is helpful.

In other words, examples of the disclosure comprise monolithic fluid sensors with emitters that are configured to emit radiation laterally. In addition, said sensors comprise waveguide structures in order to cover a wide spherical angle of the radiation emission directions of the emitter, in order to collect emitted radiation and guide said radiation to the detector.

According to further examples of the disclosure a fluid sensor may comprise a planar emitter, wherein the radiation is coupled into a deeper or buried WG.

According to further examples of the disclosure a fluid sensor may achieve ~300 ppm accuracy at a resolution of ~500 ppm, wherein the waveguide structure or WG has a width of 500 μm and a length of 5 mm.

Further examples of the disclosure comprise, for example in order to improve performance one or more of the following:
   Waveguide structures with a large area, e.g. relative to the area of the common system plane, or in other words big WGs. Bigger WGs may yield even better values (accuracy and resolution)
   Waveguide structures with a good coupling efficiency. Improved coupling efficiencies may reduce losses (e.g. in the radiation path: Heater→WG; WG→Detector)
   Waveguide structures or WGs with a high evanescence field ratio with low, or at least lower, losses.

In addition or alternatively, examples of the disclosure may comprise the one or more of the following advantages:

Form factor (e.g. especially thickness<500 μm)

Fluid sensors according to the disclosure may be fabricated in any shape suitable, because of the ability to specify a certain radiation path via the waveguide structure. Therefore, the fluid sensor may be integrated in for example tight or twisted spaces between other arrangements on a wafer. Moreover, small footprints and thicknesses may be achieved according to the disclosure. In addition, with a monolithic fabrication, only a small amount of wafer-space may be used for the sensor, and a package comprising the sensor may be thin.

8" and 12" fabrication possible

Fluid sensors may be formed on 8" and/or 12" waver. Production on large wavers may reduce the costs for each fluid sensor.

Monolithic approach

Monolithic fabrication enables low cost and high output production of fluid sensors according to the disclosure.

Potential liquid sensor

The surrounding fluid may be a liquid. In general, the fluid sensor may be configured to sense a plurality of gases, or in other words the sensor may be configured to perform multi-gas sensing Potentially more robust Fluid sensors according to the disclosure may be robust. For example, robust with regard to surrounding fluids, or operating time.

Furthermore, fluid sensors according to the disclosure may require a low amount of power, e.g. a reduced amount of power in comparison with equivalent-performance fluid sensors.

Moreover, fluid sensors according to examples of the disclosure may be less effected by influences of environmental effects e.g., humidity and/or temperature. The increased electrical efficiency may be able to compensate efficiency losses causes by environmental effects. In addition, said fluid sensors may provide an improved reliability and a lower sensitivity reduction due to aging. Furthermore, a sensor arrangement according to examples of the disclosure may have a long lifetime, e.g., a high number of measurement cycles—especially for the heater.

In addition, examples of the disclosure comprise integrated sensor systems, e.g. fluid sensors, or comprising fluid sensors, as explained above.

Further examples of the disclosure are based on spectroscopy using the evanescent field.

Further examples of the disclosure comprise monolithic gas sensors based on waveguides.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

The above described examples are merely illustrative for the principles of the present disclosure. It is understood that modifications and variations of the arrangements and the details described herein will be apparent to others skilled in the art. It is the intent, therefore, to be limited only by the scope of the impending patent claims and not by the specific details presented by way of description and explanation of the examples herein.

What is claimed is:

1. A fluid sensor comprising:
   a support structure having a top main surface region, wherein the top main surface region of the support structure forms a common system plane of the fluid sensor;
   a thermal emitter on the top main surface region of the support structure, wherein the thermal emitter is configured to emit thermal radiation in at least two different radiation emission directions parallel to the common system plane;
   a thermal radiation detector on the top main surface region of the support structure, wherein the thermal radiation detector is configured to detect thermal radiation; and
   a waveguide structure having a first and a second waveguide section on the top main surface region of the support structure, wherein the first waveguide section is operatively coupled to a first lateral side of the thermal emitter, and wherein the second waveguide section is operatively coupled to a second lateral side of the thermal emitter opposite to the first lateral side,
   wherein the first waveguide section is configured to guide a first portion of the thermal radiation, emitted by the thermal emitter in a first radiation emission direction of the at least two different radiation emission directions of the thermal emitter, to the thermal radiation detector,
   wherein the second waveguide section is configured to guide a second portion of the thermal radiation, emitted by the thermal emitter in a second radiation emission direction of the at least two different emission radiation directions of the thermal emitter, to the thermal radiation detector, and
   wherein the waveguide structure is configured to enable an interaction of an evanescence field of the guided first and/or second portion of the thermal radiation with a surrounding fluid.

2. The fluid sensor according to claim 1, wherein the thermal radiation detector is configured to detect thermal radiation from at least two different detection directions parallel to the common system plane,
   wherein the first waveguide section is configured to guide the first portion of the thermal radiation to the thermal radiation detector, such that the guided first portion of the thermal radiation is coupled to the thermal radiation detector from a first detection direction of the at least two different detection directions of the thermal radiation detector, and
   wherein the second waveguide section is configured to guide the second portion of the thermal radiation to the thermal radiation detector, such that the guided second portion of the thermal radiation is coupled in the thermal radiation detector from a second detection direction of the at least two different detection directions of the thermal radiation detector.

3. The fluid sensor according to claim 2, wherein the first and second radiation emission directions are opposite to one another, and
   wherein the first and second detection directions are opposite to one another.

4. The fluid sensor according to claim 1, wherein the waveguide structure comprises curved waveguides and/or rectangular waveguides.

5. The fluid sensor according to claim 1, wherein the fluid sensor comprises a filter structure and wherein the filter structure is configured to filter the first and/or second portion of the thermal radiation emitted by the thermal emitter, and wherein the waveguide structure comprises the filter structure, and/or wherein the thermal emitter comprises the filter structure, and/or wherein the thermal radiation detector comprises the filter structure, and/or wherein the filter structure is arranged on the top main surface region of the support structure between the thermal emitter and the waveguide structure and/or between the thermal radiation detector and the waveguide structure.

6. The fluid sensor according to claim 5, wherein the thermal emitter comprises a semiconductor strip and wherein the semiconductor strip is configured to emit a broadband thermal radiation, as the thermal radiation, in the at least two different radiation emission directions, wherein the filter structure is an optical filter structure comprising a semiconductor material, wherein the optical filter structure has a narrow transmission band, and wherein the optical filter structure is configured to filter the broadband thermal radiation, emitted in the at least two different radiation emission directions.

7. The fluid sensor according to claim 6, wherein the optical filter structure comprises a photonic crystal structure and/or a Bragg filter structure as wavelength selective optical elements.

8. The fluid sensor according to claim 6, wherein the semiconductor strip comprises a doped polysilicon material to form a black body radiator and is configured to have, in an actuated condition, an operating temperature in a range between 500° C. and 900° C.

9. The fluid sensor according to claim 6, wherein the waveguide structure is configured to provide an evanescent field ratio of the guided first and/or second portion of the thermal radiation of at least 5% and at most 90% or of at least 35% and at most 50%.

10. The fluid sensor according to claim 1, wherein the support structure comprises a rigid structure and a substrate on a bottom surface of the rigid structure, wherein a top surface, opposite to the bottom surface, of the rigid structure is the top main surface region, and wherein the rigid structure is configured to confine the thermal radiation, radiated by the thermal emitter.

11. The fluid sensor according to claim 10, wherein the substrate comprises at least one substrate cavity, and wherein the at least one substrate cavity is arranged vertically, with respect to the common system plane, below the thermal emitter and/or the thermal radiation detector and/or the waveguide structure, for thermal insulation, of the thermal emitter and/or the thermal radiation detector and/or the waveguide structure, from the substrate.

12. The fluid sensor according to claim 1, wherein the fluid sensor has a footprint in the common system plane of less than 50 mm² or less than 40 mm² or less than 20 mm² and/or a height, wherein the height is orthogonal to the system plane, of less than 1000 µm or less than 450 µm or less than 400 µm.

13. The fluid sensor according to claim 1, wherein the waveguide structure comprises at least one of a slab waveguide, a strip waveguide, a slot waveguide, a slot-array waveguide and/or a multi-slot waveguide, and/or wherein the thermal radiation detector comprises at least one of a pyroelectric temperature sensor, a piezoelectric temperature sensor, a pn junction temperature sensor and/or a resistive temperature sensor.

14. The fluid sensor according to claim 5, wherein at least one of the thermal radiation detector, the waveguide structure, the filter structure and/or the thermal emitter is arranged monolithically on the support structure.

15. A method comprising:

emitting thermal radiation in at least two different radiation emission directions parallel to a common system plane, wherein the common system plane is formed by a top main surface region of a support structure, and wherein the thermal radiation is emitted by a thermal emitter arranged on the top main surface region of the support structure; and guiding a first portion of the thermal radiation, emitted by the thermal emitter in a first radiation emission direction of the at least two different radiation emission directions of the thermal emitter, to a thermal radiation detector via a first waveguide section of a waveguide structure, wherein the first waveguide section is operatively coupled to a first lateral side of the thermal emitter, such that an evanescence field of the guided first portion of the thermal radiation interacts with a fluid that is surrounding the waveguide structure; and guiding a second portion of the thermal radiation, emitted by the thermal emitter in a second radiation emission direction of the at least two different radiation emission directions of the thermal emitter, to the thermal radiation detector via a second waveguide section of the waveguide structure, wherein the second waveguide section is operatively coupled to a second lateral side of the thermal emitter opposite to the first lateral side, such that an evanescence field of the guided second portion of the thermal radiation interacts with the fluid that is surrounding the waveguide structure, wherein the thermal radiation detector is arranged on the top main surface region of the support structure, wherein the waveguide structure is arranged on the top main surface region of the support structure; and detecting the guided first and/or second portion of the thermal radiation via the thermal radiation detector.

16. A fluid sensor comprising:

a thermal emitter configured to emit thermal radiation in at least two different radiation emission directions;

a thermal radiation detector configured to detect thermal radiation; and a waveguide structure having a first and a second waveguide section, wherein the first waveguide section is operatively coupled to a first lateral side of the thermal emitter and operatively coupled to the thermal radiation detector, and wherein the second waveguide section is operatively coupled to a second lateral side of the thermal emitter opposite to the first lateral side and operatively coupled to the thermal radiation detector.

17. The fluid sensor of claim 16, wherein, in operation, the waveguide structure comprises an evanescence field for interacting with a surrounding fluid.

18. The fluid sensor according to claim 16, wherein the waveguide structure comprises curved waveguides or rectangular waveguides.

19. The fluid sensor according to claim 16, wherein the fluid sensor comprises a filter structure configured to filter the thermal radiation emitted by the thermal emitter.

20. The fluid sensor according to claim 19, wherein the filter structure is housed in the waveguide structure, the thermal emitter, or the thermal radiation detector.

* * * * *